United States Patent
Toyooka et al.

[11] Patent Number: 5,496,498
[45] Date of Patent: *Mar. 5, 1996

[54] COMPENSATOR FOR LIQUID CRYSTAL DISPLAY

[75] Inventors: Takehiro Toyooka, Yokohama; Shigeki Iida, Kawasaki; Hiroyuki Itoh, Yokohama, all of Japan

[73] Assignee: Nippon Oil Company, Tokyo, Japan

[*] Notice: The term of this patent shall not extend beyond the expiration date of Pat. No. 5,193,520.

[21] Appl. No.: 357,548

[22] Filed: Dec. 16, 1994

Related U.S. Application Data

[63] Continuation of Ser. No. 32,426, Mar. 16, 1993, abandoned, which is a continuation of Ser. No. 720,604, Jun. 25, 1991, abandoned.

[30] Foreign Application Priority Data

Jun. 26, 1990 [JP] Japan ................... 2-165718

[51] Int. Cl.⁶ .................. C09K 19/52; G02F 1/13
[52] U.S. Cl. ................... 252/299.01; 359/73
[58] Field of Search ................. 252/299.01; 359/73

[56] References Cited

U.S. PATENT DOCUMENTS

| | | | |
|---|---|---|---|
| 4,293,435 | 10/1981 | Portugall et al. | 252/299.01 |
| 4,443,065 | 4/1984 | Funada et al. | 350/335 |
| 4,702,558 | 10/1987 | Coles et al. | 350/330 |
| 4,995,705 | 2/1991 | Yoshinaga et al. | 350/350 S |
| 5,054,888 | 10/1991 | Jacobs et al. | 359/76 |
| 5,132,147 | 7/1992 | Takiguchi et al. | 427/393.5 |
| 5,133,895 | 7/1992 | Ogawa et al. | 252/299.4 |
| 5,193,020 | 3/1993 | Shiozaki et al. | 359/73 |
| 5,206,752 | 4/1993 | Itoh et al. | 359/106 |
| 5,308,535 | 5/1994 | Scheuble et al. | 252/299.01 |
| 5,359,443 | 10/1994 | Toyooka et al. | 359/76 |

Primary Examiner—Gary Geist
Assistant Examiner—C. H. Kelly
Attorney, Agent, or Firm—Scully, Scott, Murphy & Presser

[57] ABSTRACT

A compensator for an active matrix type liquid crystal display using a thin film transistor is provided. The compensator is made by a film of a liquid crystalline polymer which exhibits a twisted nematic orientation in a liquid crystal state and assumes a glassy state at temperatures below a liquid crystal transition point thereof, the constituent molecules of the liquid crystalline polymer film having a helical structure with a helical axis wherein the twist angle is in the range of 70 to 150 degrees, and the product $\Delta n \cdot d$ of birefringence $\Delta n$ of the liquid crystalline polymer film and film thickness, d, being in the range of 0.2 to 3.0 μm.

13 Claims, 1 Drawing Sheet

COMPENSATOR FOR LIQUID CRYSTAL DISPLAY

This is a continuation of application No. 08/032,426, filed Mar. 16, 1993, abandoned which is a continuation of prior application No. 07/720,604, filed Jun. 25, 1991, now abandoned.

BACKGROUND OF THE INVENTION

The present invention relates to a compensator for liquid crystal display and more particularly to a compensator for an active matrix type liquid crystal display (hereinafter referred to simply as "TFT-LCD") using a thin film transistor.

Liquid crystal display occupies an important position in the display field because of such characteristic features as being driven at a low voltage, light weight and low cost. Above all, a TFT-LCD is high in response speed, relatively small in viewing angle dependence and affords a clear color image, and because of these characteristics the TFT-LCD is most expected as the next generation LCD. Researches and developments are being made actively. In the case of a TFT-LCD, however, it is very difficult to manufacture an LCD having a screen size of 10 inches or so in diagonal angle, and in addition to this serious problem, the performance thereof is not completely satisfactory yet. If the cell gap is thinned for the purpose of improving performance, for example, improving the response speed, improving the viewing angle characteristic, or decreasing the driving voltage, the product $\Delta n \cdot d$ of the birefringence of liquid crystal, $\Delta n$, and the cell gap, d, becomes smaller and the mode of light travelling through the liquid crystal is no longer a linear polarization but becomes an elliptical polarization. As a result, there arises the problem of interference color when combined with a polarizer This phenomenon is more marked as the value of $\Delta n \cdot d$ called Morgan limit becomes smaller than Morgan limit (about 2 μm), leading to deterioration of the display quality such as contrast and color quality.

The interference color created by such decrease of the cell gap can be cancelled by disposing on a display cell a compensator capable of making a transmitted light as an eliptically polarized light after passing through the display cell again into a linearly polarized light. This compensating method has already been used practically in simple matrix LCD's of a super-twisted nematic (STN) type. More concretely, there are known a double-cell compensating method further using another liquid crystal cell for compensation, and a retardation film compensating method. However, the former method makes further difficult the manufacture of TFT-LCD which is originally difficult, because of heavy weight and large thickness, so is never preferable. On the other hand, the latter method is insufficient in its ability of cancelling the interference color and so is not satisfactory as a compensation method for TFT-LCD which is greatly characterized by a high display quality.

It is the object of the present invention to solve such problems of the prior art.

SUMMARY OF THE INVENTION

In order to overcome the problems involved in the foregoing conventional compensation methods the present inventors thought it necessary to provide a compensator having a perfect compensating ability which permits simultaneous compensation of both phase difference and optical rotatory dispersion, and which permits the use of substantially only one sheet of film without using another liquid crystal cell as in the double-cell method. As a result of extensive studies we found out that the object of the present invention could be attained by manufacturing a compensator using a liquid crystalline polymer which permits solidifying of a twisted nematic orientation structure. In this way we accomplished the present invention.

The present invention resides in a compensator for liquid crystal display of an active matrix type constituted by a film of a liquid crystalline polymer which exhibits a twisted nematic orientation in a liquid crystal state and assumes a glassy state at temperatures below a liquid crystal transition point thereof, the constituent molecules of the liquid crystalline polymer film having a helical structure with a helical axis wherein the twist angle is in the range of 70 to 150 degrees, and the product $\Delta n \cdot d$ of birefringence $\Delta n$ of the liquid crystalline polymer film and film thickness, d, being in the range of 0.2 to 3.0 μm.

The present invention further resides in a compensator for liquid crystal display of an active matrix type comprising a light transmitting base, an alignment film formed on the base, and film of a liquid crystalline polymer which exhibits a twisted nematic orientation in a liquid crystal state and assumes a glassy state at temperatures below a liquid crystal transition point thereof. Particularly, the present invention further resides in a compensator for liquid crystal display of an active matrix type wherein the constituent molecules of the said liquid crystalline polymer have a helical structure with a helical axis in a direction perpendicular to the base, with a twist angle being in the range from 70 to 150 degrees and with the value of $\Delta n \cdot d$ being in the range from 0.2 to 3.0 μm.

DETAILED DESCRIPTION OF THE INVENTION

The present invention will be described in detail hereinunder.

The compensator of the present invention is produced by applying onto an alignment film formed on a light transmitting base a composition comprising a liquid crystalline polymer which exhibits a uniform nematic orientation of monodomain and which permits its orientated state to be solidified easily, and a predetermined amount of an optically active compound incorporated in the said liquid crystalline polymer, or such liquid crystalline polymer alone, followed by drying and heat treatment to form a uniform, twisted, nematic structure of monodomain and subsequent cooling. In this way the orientation in the liquid crystal state can be solidified.

First, an explanation will be made about the former compensator using a composition comprising such nematic liquid crystalline polymer and an optically active compound. The liquid crystalline polymer as a base material which exhibits a uniform nematic orientation of monodomain and which permits its orientated state to be fixed or immobilized easily is required to have the following property as an essential condition. For stable solidification of the nematic orientation, when viewed in terms of a phase series of liquid crystal, it is important that there be no crystal phase in a lower temperature region than nematic phase. If such crystal phase is present, an inevitable passage through it at the time of cooling for solidification results in destruction of the nematic orientation once obtained, thus leading to unsatisfactory transparency and compensating effect. In preparing the compensator of the present invention, therefore, it is absolutely necessary to use a liquid crystalline polymer having glass phase in a lower temperature region than nematic phase. This polymer, when an optically active compound is incorporated therein, exhibits a twisted nematic orientation in a liquid crystal state and assumes a glass phase at temperatures below a liquid crystal transition point thereof, so that the twisted nematic structure can be fixed easily. There may be used any such polymer which exhibits a nematic orientation in the state of liquid crystal and assumes the state of glass at temperatures below the liquid crystal transition point thereof. Examples are main chain type liquid crystalline polymers such as polyesters, polyamides, polycarbonates, and polyester imides, as well as side chain type liquid crystalline polymers such as polyacrylates, polymethacrylates, polymalonates, and polysiloxanes. Particularly, polyesters are preferred in point of easy preparation, good orientation and high glass transition point. Polyesters containing an ortho-substituted aromatic unit are most preferred. Polymers containing as a repeating unit an aromatic unit having a bulky substituent group in place of an ortho-substituted aromatic unit or an aromatic unit having fluorine or a fluorine-containing substituent group, are also employable. The "ortho-substituted aromatic unit" as referred to herein means a structural unit with main chain-constituting bonds ortho to each other. Examples are the following catechol, salicylic acid and phthalic acid units as well as substituted derivatives thereof:

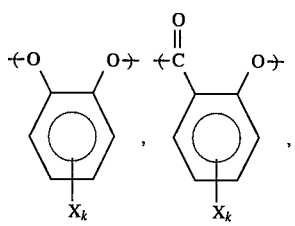

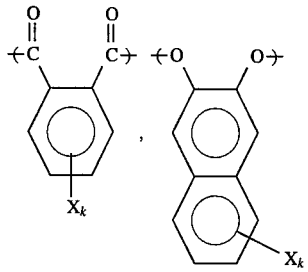

wherein X represents hydrogen, halogen, e.g. Cl or Br, an alkyl or alkoxy group having 1 to 4 carbon atoms, or phenyl, and k is 0 to 2.

The following are particularly preferred:

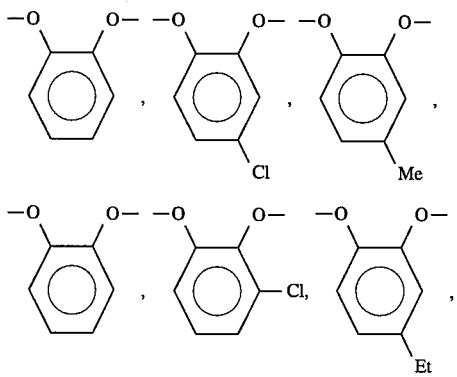

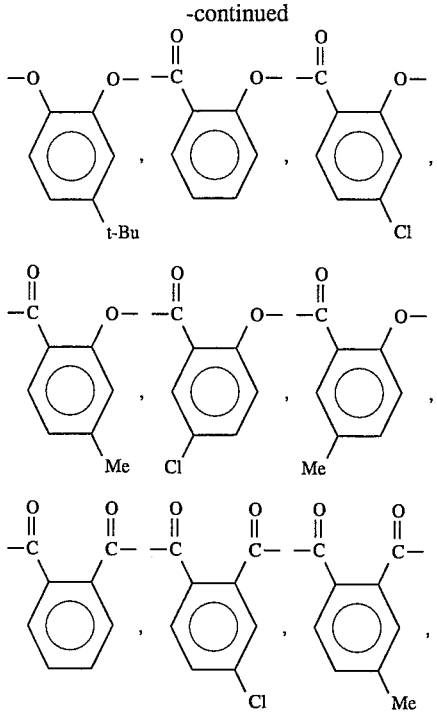

Me: methyl
Et: ethyl
Bu: butyl

Also, as examples of the polyester used preferably in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

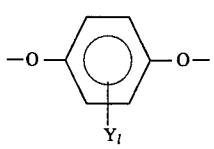

wherein Y represents hydrogen, halogen, e.g. Cl or Br, an alkyl or alkoxy group having 1 to 4 carbon atoms, or phenyl, and l is 0 to 2,

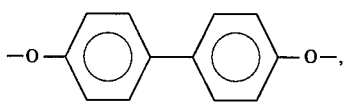

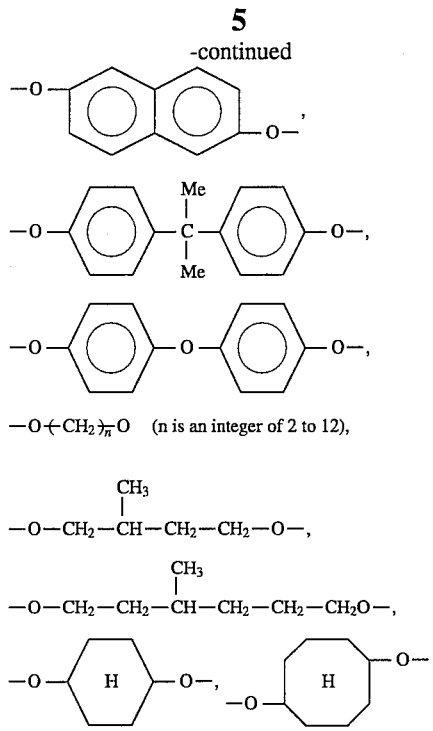

Particularly, the following are preferred:

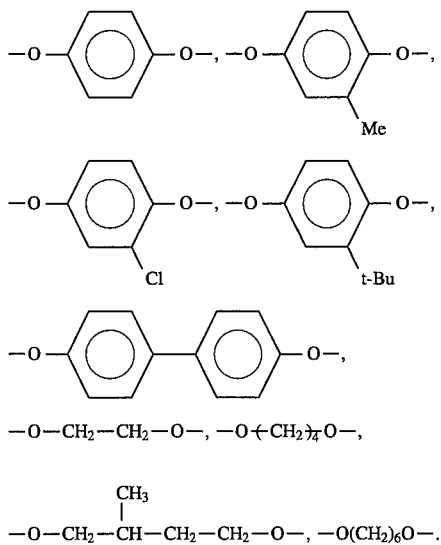

As examples of the dicarboxylic acid component, the following may be mentioned:

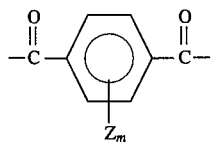

wherein Z represents hydrogen, halogen, e.g. Cl or Br, an alkyl or alkoxy group having 1 to 4 carbon atoms, or phenyl, and m is 0 to 2,

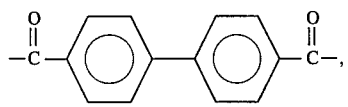

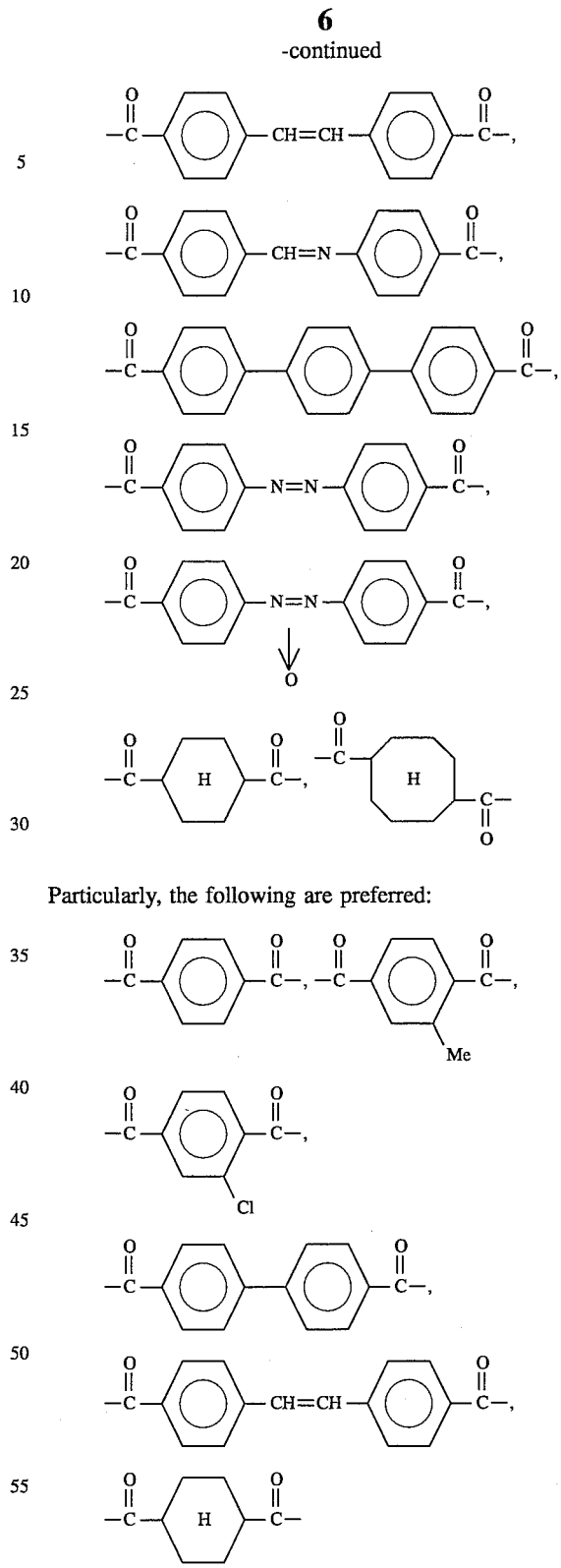

Particularly, the following are preferred:

As examples of the hydroxycarboxylic acid component, the following units may be mentioned:

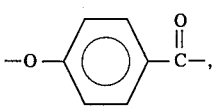

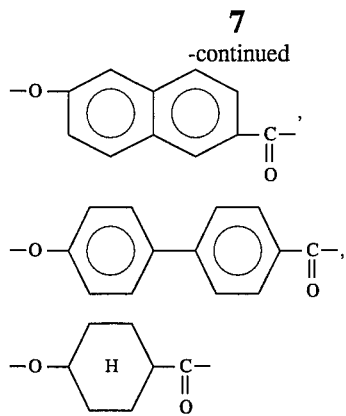

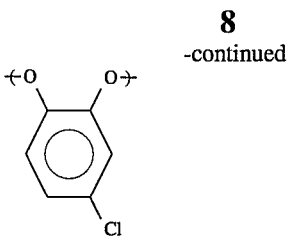

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, more preferably 10 to 30 mole %.

In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention:

Polymer consisting essentially of the following structural units:

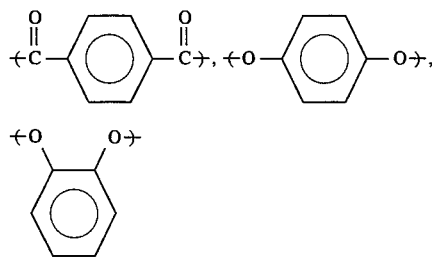

Polymer consisting essentially of the following structural units:

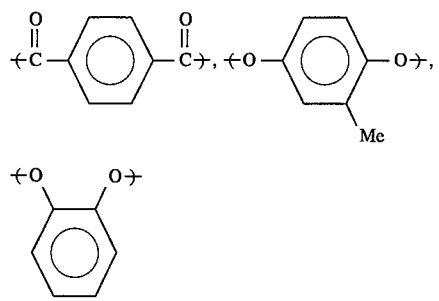

Polymer consisting essentially of the following structural units:

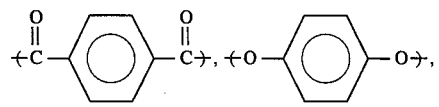

Polymer consisting essentially of the following structural units:

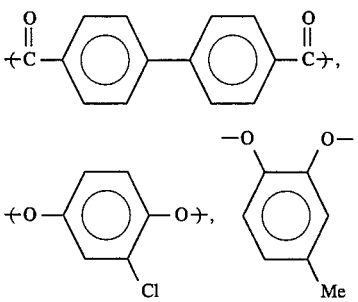

Polymer consisting essentially of the following structural units:

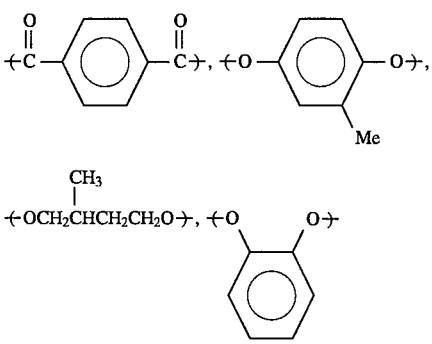

Polymer consisting essentially of the following structural units:

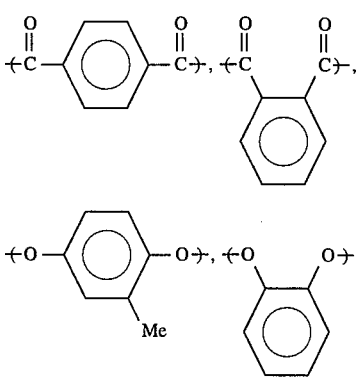

Polymer consisting essentially of the following structural units:

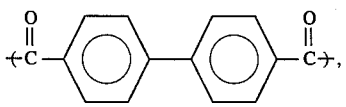

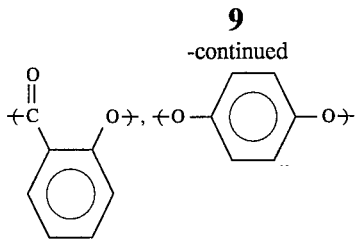

Polymer consisting essentially of the following structural units:

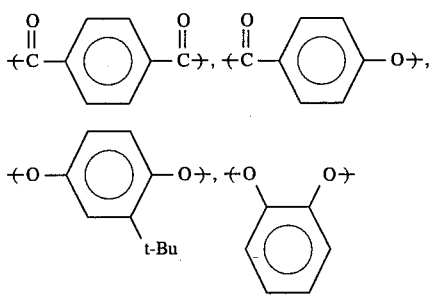

Also preferred are polymers which, in place of ortho-substituted aromatic units, contain as repeating units such bulky substituent-containing aromatic units or aromatic units containing fluorine or fluorine-containing substituents as shown below:

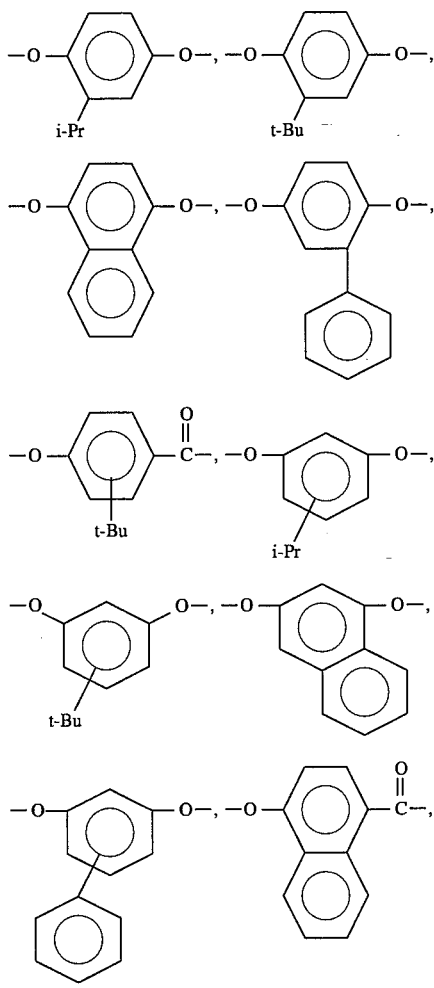

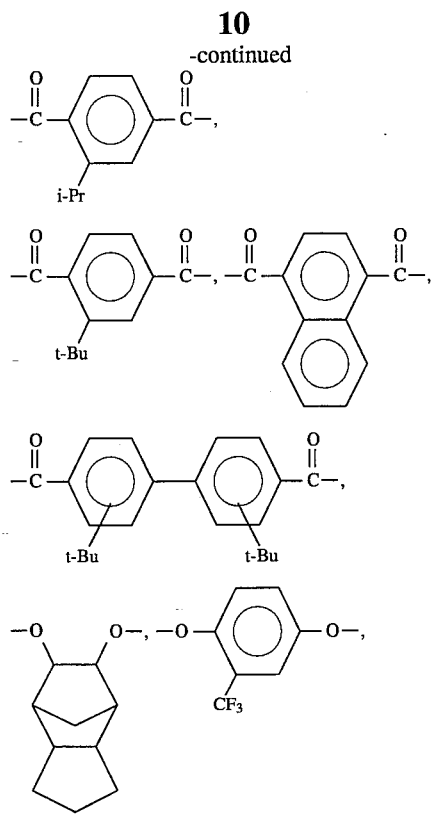

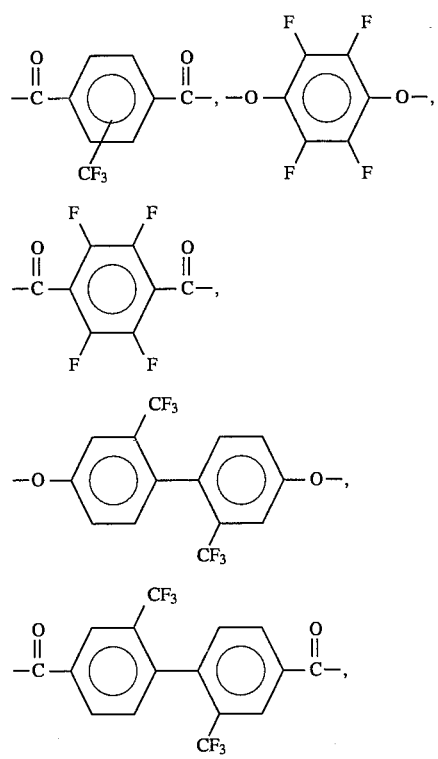

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition points of these polyesters are also important, exerting influence on the stability of orientation after the immobilizattion thereof. The glass transition temperature is usually not lower than 0° C. , preferably not lower than 10° C. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the compensator at room temperature or thereabouts may cause a change of the liquid crystal structure once immobilized, thus resulting in the deterioration of a function based on the liquid crystal structure. Therefore, such low glass transition point is not desirable.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

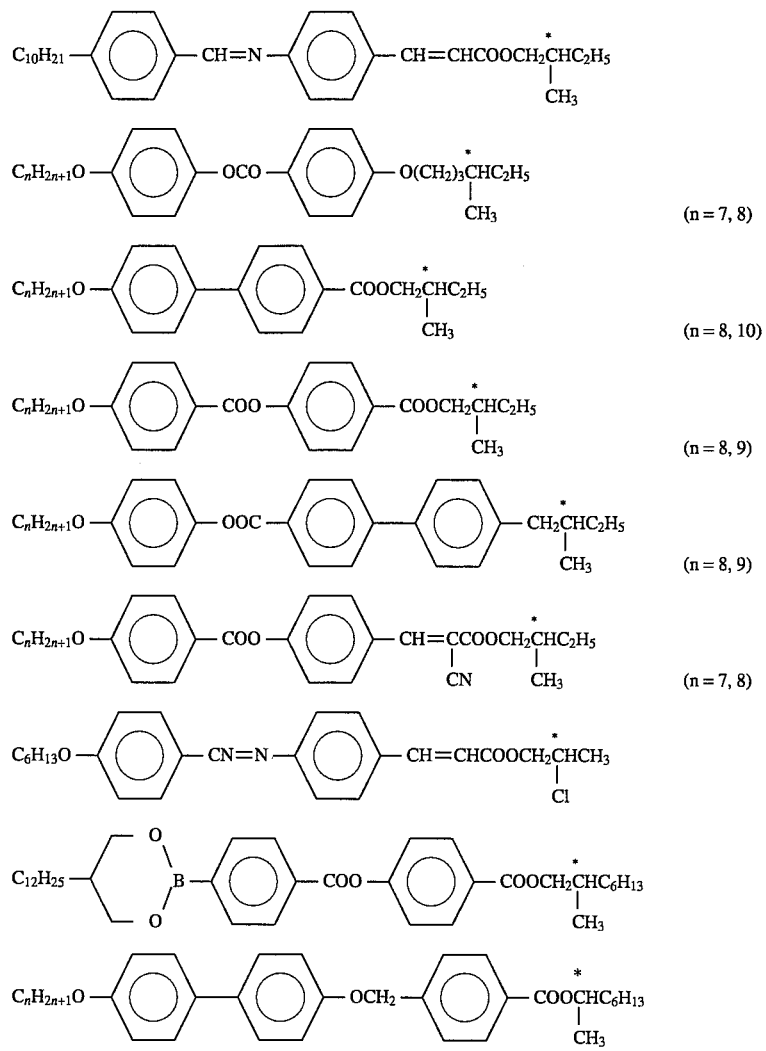

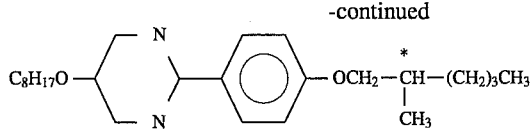

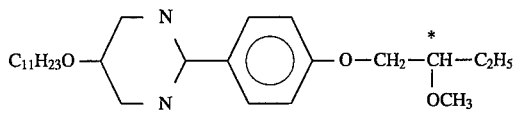

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a high polymer which exhibits liquid crystallinity. Examples are the following liquid crystalline high polymers having optical activity: polyacrylates, polymethacrylates, polymalonates, polysiloxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer comprising the following structural units:

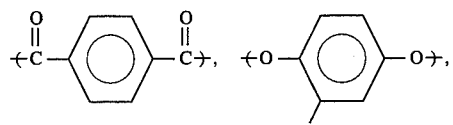

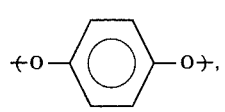

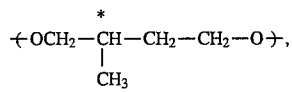

Polymer comprising the following structural units:

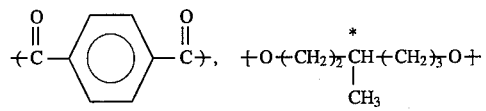

Polymer comprising the following structural units:

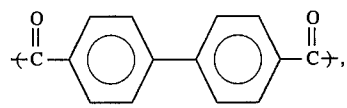

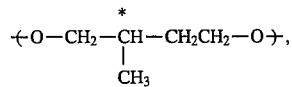

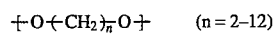   (n = 2–12)

Polymer comprising the following structural units:

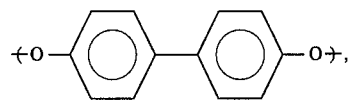

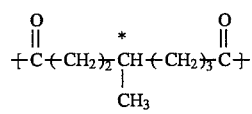

Polymer comprising the following structural units:

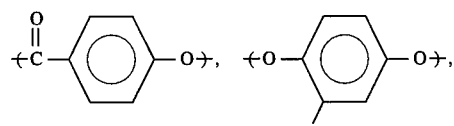

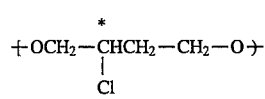

Polymer comprising the following structural units:

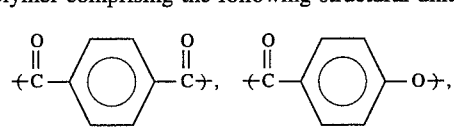

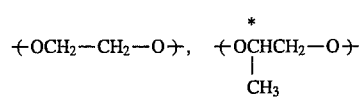

Polymer comprising the following structural units:

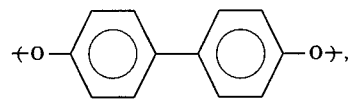

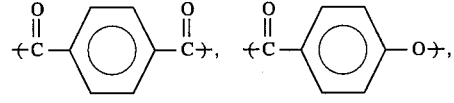

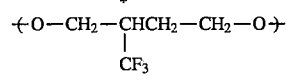

Polymer comprising the following structural units:

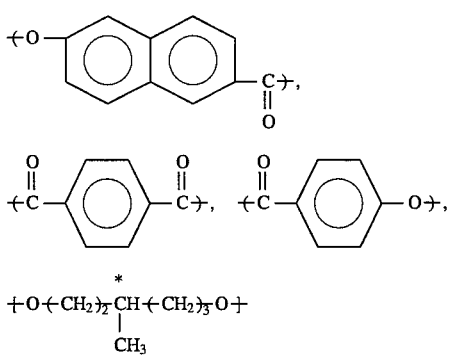

Polymer comprising the following structural units:

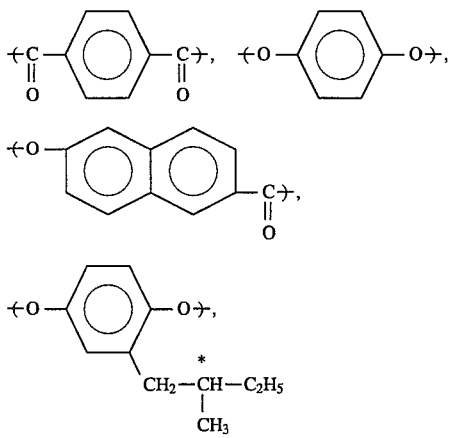

Polymer comprising the following structural units:

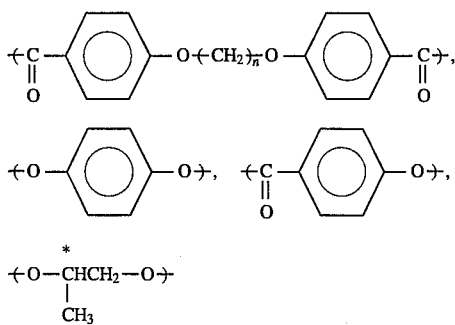

Polymer comprising the following structural units:

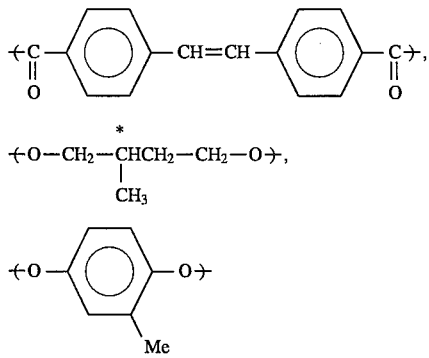

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

In the present invention, the liquid crystalline polymer which exhibits a twisted nematic orientation in the state of liquid crystal and assumes a glassy state at a temperature below the liquid crystal transition point of the polymer, can be prepared by mixing a nematic liquid crystalline polymer and an optically active compound at a predetermined ratio by a solid mixing, solution mixing or melt-mixing method. The proportion of the optically active component in the composition is in the range of preferably 0.1 to 30 wt %, more preferably 0.3 to 20 wt %, although it differs depending on the proportion of optically active groups contained in the optically active compound or the twisting force of the optically active compound for imparting twist to the nematic liquid crystal. If the proportion of the optically active compound is less than 0.1 wt %, it will be impossible to impart a sufficient twist to the nematic liquid crystal, and a proportion thereof greater than 30 wt % will exert a bad influence on the orientation.

The compensator of the present invention can also be prepared by using a high molecular liquid crystal which provides a uniform, twisted nematic orientation of monodomain for itself without using any other optically active compound and which permits the state of such orientation to be immobilized easily. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

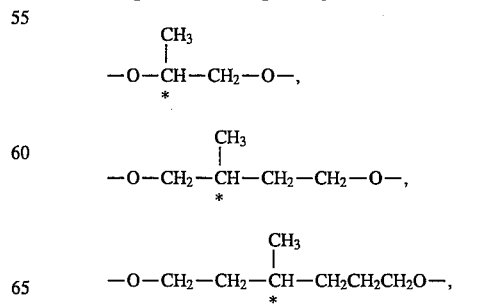

-continued

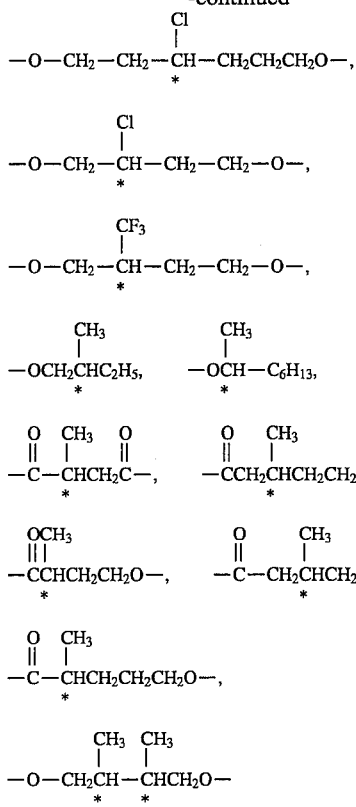

The proportion of these optically active groups in the polymers is in the range of preferably 0.1 to 20 mole %, more preferably 0.5 to 10 mole %. If the said proportion is less than 0.1 mole %, there will not be obtained a twisted structure required for the compensator, and a proportion thereof large than 20 mole % is not desirable because a too strong twisting power will cause the deterioration of the compensating effect. The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting high molecular liquid crystal will be low, while if the intrinsic viscosity is larger than 3.0, there will arise problems such as the deterioration of orientatability and an increase of the time required for orientation because of too high viscosity during the formation of liquid crystal. Also important are the glass transition points of these polyesters, which exert influence on the stability of orientation after the immobilization of orientation. The glass transition temperature is usually not lower than 0° C., preferably not lower than 10° C. Assuming that the working temperature is room temperature or thereabouts, it is desirable that the glass transition point be not lower than 30° C., more preferably not lower than 50° C., though this differs depending on the use. If the glass transition point is lower than 0° C., the use of the compensator at room temperature or thereabouts may cause a change of the liquid crystal structure which has once been immobilized, thus resulting in the deterioration of a function based on the liquid crystal structure.

These polymers can be prepared by the foregoing melt polycondensation process or acid chloride process.

The following are typical examples of the liquid crystalline polymer used in the present invention described above.

Polymers represented by:

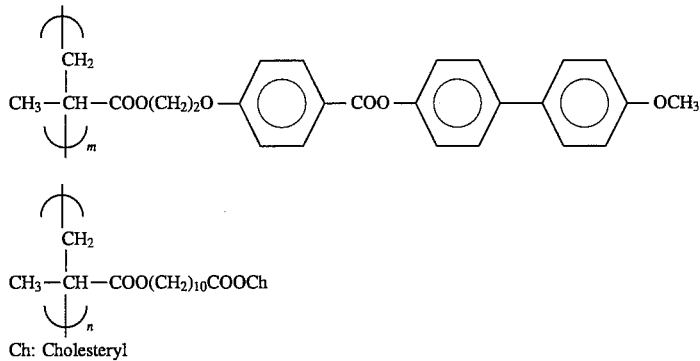

Ch: Cholesteryl m/n=usually 99.9/0.1 to 80/20, preferably 99.5/0.5 to 90/10, more preferably 99/1 to 95/5

Polymers represented by:

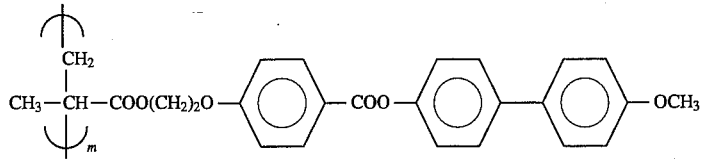

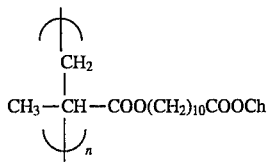

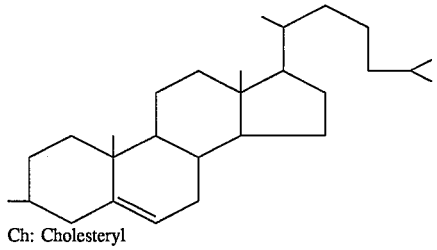

Ch: Cholesteryl m/n=usually 99.9/0.1 to 80/20, preferably 99.5/0.5 to 90/10, more preferably 99/1 to 95/5

Polymers represented by:

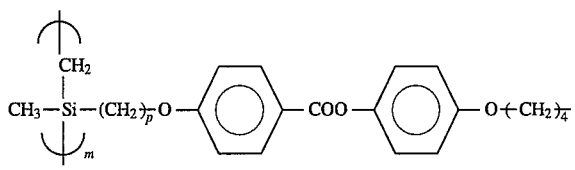

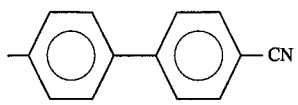

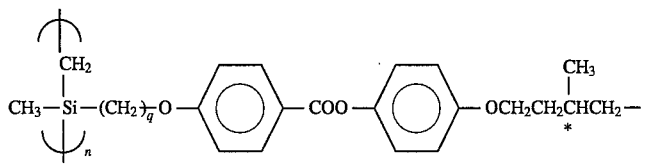

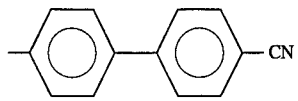

m/n=usually 99.9/0.1 to 70/30, preferably 99.5/0.5 to 90/10, more preferably 99/1 to 95/5 p, q: integer of 2 to 20

Polymers represented by:

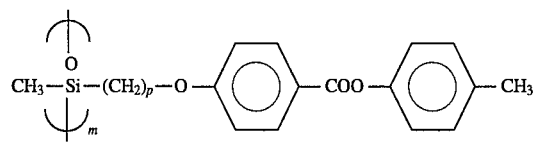

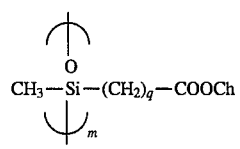

m/n=usually 99.9/0.1 to 70/30, preferably 99.5/0.5 to 90/10, more preferably 99/1 to 95/5 p, q: integer of 2 to 20

Polymers represented by:

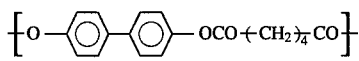

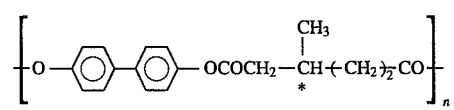

m/n=usually 99.9/0.1 to 80/20, preferably 99.5/0.5 to 90/10, more preferably 99/1 to 95/5

Polymers represented by:

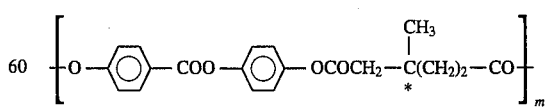

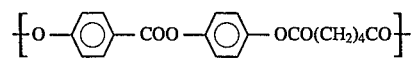

m/n=0.5/99.5 to 10/90, preferably 1/99 to 5/95

Polymers represented by:

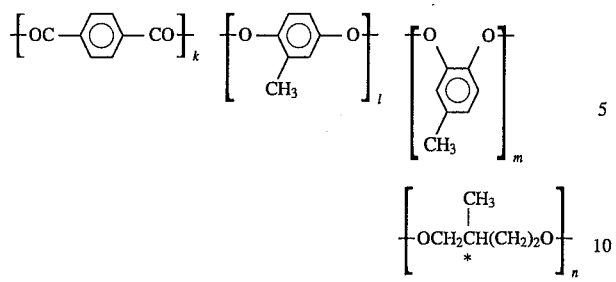

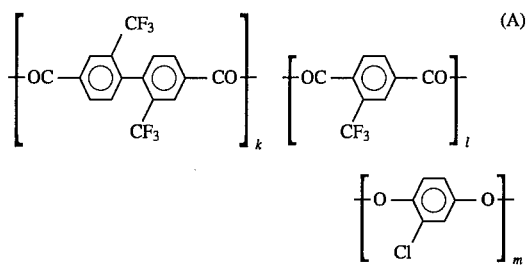

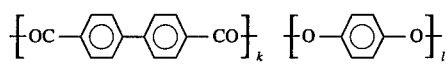

k=l+m+n
k/n=99.5/0.5 to 90/10, preferably 99/1 to 95/5
l/m=5/95 to 95/5
Polymers represented by:

(B) cholesteryl benzoate
(A)/(B)=usually 99.9/0.1 to 70/30 (weight ratio), preferably 99.5/0.5 to 80/20, more preferably 99/1 to 90/10
m=k+l
k/l=80/20 to 20/80
Polymer mixtures represented by:

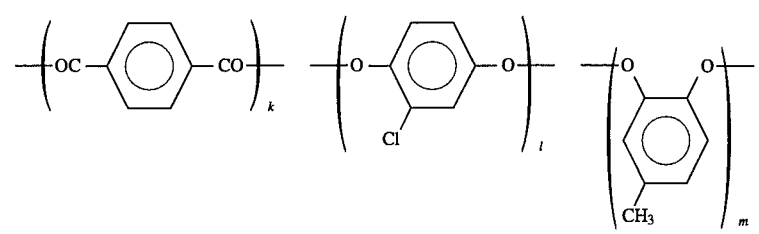

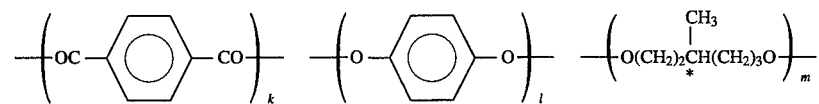

-continued

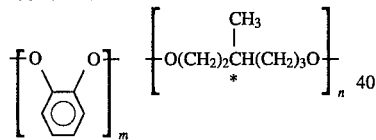

k=l+m+n
k/n=99.5/0.5 to 90/10, preferably 99/1 to 95/5
l/m=5/95 to 95/5
Polymer mixtures represented by:

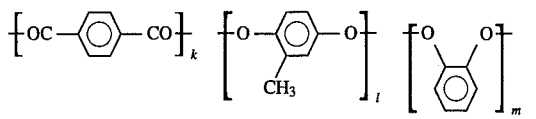

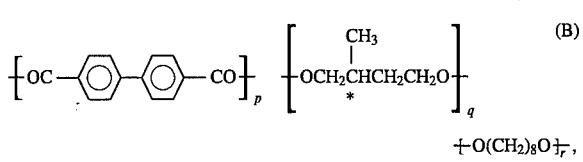

(A)/(B)=usually 99.9/0.1 to 80/20 (weight ratio), preferably 99.5/0.5 to 85/5, more preferably 99/1 to 95/5
k=l+m
l/m=75/25 to 25/75
p=q+r
p/q=80/20 to 20/80
Polymer mixtures represented by:

(A)/(B)=usually 99.5/0.1 to 70/30 (weight ratio), preferably 99.5/0.5 to 80/20, more preferably 99/1 to 90/10
k=l+m
l/m=25/75 to 75/25
p=q+r
p/r=20/80 to 80/20
The mark * represents an optically active caroon.

These polymers range in molecular weight preferably from 0.05 to 3.0, more preferably 0.07 to 2.0, in terms of inherent viscosity as determined at 30° C. in a solvent, e.g. tetrahydrofuran, acetone, cyclohexanone, or mixed phenol/tetrachloroethane (60/40) solvent. If the inherent viscosity is smaller than 0.05, the strength of the resulting liquid crystalline polymer will be low, and a larger value than 3.0 will result in too high viscosity during the formation of liquid crystal, thus causing deteriorated orientatability and increase in the time required for orientation.

A typical constructional example of the compensator of the present invention is a three-layer structure comprising a light transmitting base, an alignment base formed on the base, and a liquid crystalline polymer film formed on the alignment film. As examples of the light transmitting base used in the invention there are mentioned glass, light transmitting plastic film, plastic sheet, and polarizing film. Examples of glass include soda glass, silica-coated soda glass, and borosilicate glass. As to the plastic base, it is desirable that it be optically isotropic. Examples are polymethyl methacrylates, polystyrenes, polycarbonates, polyether sulfones, polyphenylene sulfides, amorphous polyolefins, triacetyl cellulose, and epoxy resins. Particularly, polymethyl methacrylates, polycarbonates, polyether sulfones and amorphous polyolefins are preferred. Suitable examples of the alignment film are polyimide films which have been subjected to a rubbing treatment. The alignment films known in this field such as an obliquely vapor-deposited film of silicon oxide and a rubbing-treated film of polyvinyl alcohol are also employable, of course.

By forming a liquid crystalline polymer film which exhibits a compensating effect on the alignment film formed on the light transmitting base there is obtained the compensator of the present invention. Where there is used a composition comprising a nematic liquid crystalline polymer and an optically active compound, for example in the case of solution mixing, both components are dissolved in a solvent at a predetermined ratio to prepare a solution having a predetermined concentration. In the case of using an optically active polymer which per se exhibits a twisted nematic orientatability in place of the liquid crystalline polymer composition, the optically active polymer alone is dissolved in a predetermined solvent at a predetermined concentration to prepare a solution. In this case, the solvent to be used differs depending on the kind of the polymer used, but usually there may be used, for example, any of ketones such as acetone, methyl ethyl ketone and cyclohexanone, ethers such as tetrahydrofuran and dioxane, halogenated hydrocarbons such as chloroform, dichloroethane, tetrachloroethane, trichloroethylene, tetrachloroethylene and o-dichlorbenzene, mixed solvents thereof with phenol, as well as dimethylformamide, dimethylacetamide and dimethyl sulfoxide. The concentration of the solution greatly differs depending on the viscosity of the polymer used, but usually it is in the range of 5% to 50%, preferably 10% to 30%. The solution is then applied onto a light transmitting glass sheet, plastic sheet or plastic film which has been subjected to an orientating treatment. How to perform the orientating treatment is not specially limited if only it causes the liquid crystal molecules to be orientated in parallel with the interface. A suitable example is a polyimide rubbing-treated glass or film obtained by applying a polyimide onto a base followed by rubbing treatment. As the coating method there may be adopted, for example, spin coating method, roll coating method, printing method, curtain coating method, or dipping/pulling up method. After the coating, the solvent is removed by drying and then heat treatment is performed at a predetermined temperature for a predetermined time to complete a twisted nematic orientation of monodomain. For assisting the orientation based on the interfacial effect, the lower the polymer viscosity, the better, and hence the higher the temperature, the more preferable, provided a too high temperature is not desirable because it will cause an increase of cost and deterioration of the working efficiency. A certain polymer has an isotropic phase in a higher temperature region than nematic phase, so even if heat treatment is made in this temperature region, there will not be obtained orientation. Thus, it is desirable that in accordance with the characteristics of the polymer used there be performed heat treatment at a temperature not lower than the glass transition point thereof and below the transition point to an isotropic phase. Usually, the range of 50° to 300° C. is preferable and the range of 100° to 250° C. is more preferable. The time required for obtaining a satisfactory orientation in the state of liquid crystal on the alignment film differs depending on the composition and molecular weight of the polymer used, but preferably it is in the range of 30 seconds to 100 minutes, more preferably 60 seconds to 60 minutes. If the said time is shorter than 30 seconds, the orientation obtained will be unsatisfactory, and if it is longer than 100 minutes, the transparency of the resulting compensator may be deteriorated. The same state of orientation can also be obtained by applying the polymer in a melted state onto the base which has been subjected to the orientation treatment, followed by heat treatment. By performing these treatments using the liquid crystalline polymer in the present invention there can be obtained a uniform, twisted nematic orientation throughout the whole upper surface of the alignment film in the state of liquid crystal.

By subsequent cooling to a temperature below the glass transition point of the liquid crystalline polymer the orientated state thus obtained can be solidified without impairing the orientation. Generally, in the case of using a polymer having crystal phase in a lower temperature region than the liquid crystal phase, the orientation in the state of liquid crystal will be destroyed by cooling. In the method of the present invention, such phenomenon does not occur because there is used a polymer having glass phase under the liquid crystal phase, and it is possible to solidify the twisted nematic orientation completely.

The cooling rate is not specially limited. Such orientation is solidified by mere transfer from within the heating atmosphere into an atmosphere held at a temperature below the glass transition point of the liquid crystalline polymer. For enhancing the production efficiency there may be performed a forced cooling such as air cooling or water cooling. The film thickness after the solidification is preferably in the range of 0.5 to 50 µm, more preferably 1 to 40 µm. The value of $\Delta n$ of the compensating layer depends on the kind of the liquid crystalline polymer used, so for controlling the value of $\Delta n \cdot d$ in the range from 0.2 to 3.0 82 m, not only the selection of the kind of the liquid crystalline polymer to be used but also the selection of film thickness, d, is important. If the film thickness is smaller than 0.5 µm, there will not be obtained necessary twist angle and $\Delta n \cdot d$, and also in the case of it exceeding 50 µm there will not be obtained necessary twist angle and $\Delta n \cdot d$; besides, the alignment film will become less effective, thus making it difficult to obtain a uniform orientation.

According to a feature of the present invention, only one film side is brought into contact with the alignment film to control orientation, while the other side of the film is left free, for example held in a contacted state with the air phase, and in this state it is possible to control orientation to a high degree and solidify the orientation. Usually, the orientation of liquid crystal is controlled by contacting both interfaces with an alignment film. When one side is air phase, the molecular orientation at the air interface is not uniform and under this influence it is impossible to obtain a uniform orientation throughout the whole area in the film thickness direction. In the present invention, a twisted nematic orientation of monodomain can be attained by controlling only one side and this orientation can be solidified. This is a great feature of the invention.

In order for the compensator of the present invention to exhibit a satisfactory compensating effect, it is important to strictly control optical parameters of the layer (compensating layer) formed by the liquid crystalline polymer film. The constituent molecules of the compensating layer have a helical structure provided with a helical axis. The helical axis usually extends in the film thickness direction, namely in the direction perpendicular to the base, and the twist angle is in the range of 70 to 150 degrees, preferably 80 to 120 degrees. Further, it is necessary that the product $\Delta n \cdot d$ of birefringence $\Delta n$ of the film formed by the liquid crystalline polymer and the film thickness d be in the range of 0.2 to 3.0 µm, preferably 0.3 to 2.5 µm.

If the twist angle and the value of $\Delta n \cdot d$ are not in the said ranges, the expected compensating effect based on the cancellation of interference color will be unsatisfactory and so it is impossible to attain a high grade of display. Of course, the value of the said twist angle is an absolute value, which is suitably adjusted to give a twist angle reverse to the twist angle of the mating cell used.

In order for the constituent molecules of the compensating layer to have a helical structure provided with a helical axis and have necessary twist angle and $\Delta n \cdot d$, a composition a liquid crystalline polymer as a base material and an optically active compound incorporated therein in the foregoing amount, or a liquid crystalline polymer having in the molecule thereof optically active groups in the foregoing proportion, is orientated and solidified into a predetermined film thickness by the method described above on an alignment film having the ability of orientating the molecules in parallel with the base.

The compensator thus obtained may be used as it is, or a surface protecting layer may be formed thereon using a transparent material. It may be used in an integral form with another optical element such as a polarizing sheet.

By the use of a single compensator for liquid crystal display of an active matrix type thus prepared by the method of the present invention it is possible to cancel the interference color induced by the decrease of the cell gap and attain a complete compensation. Consequently, the compensator of the invention contributes not only to the upgrading of TFT-LCD but also to the reduction in thickness and weight of liquid crystal display. Thus, it is of great industrial value.

EXAMPLES

Figure 1:
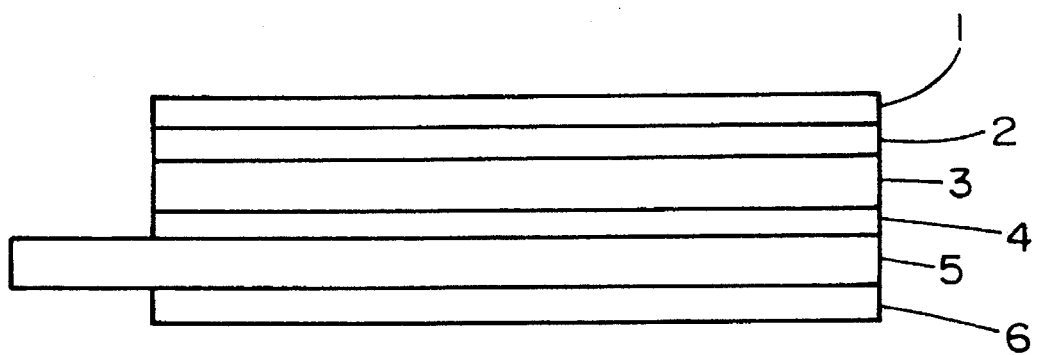
FIG. 1 is a sectional view of TFT-LCD used in the following Examples of the present invention.

The following examples are given to further illustrate the present invention, but it is to be understood that the invention is not limited thereto. The analyzing methods used in those Examples are as follows.

(1) Determination of Polymer Composition

Polymer was dissolved in deuterated chloroform or deuterated trifluoroacetic acid and the polymer composition was determined using $^1$H-NMR of 400 MHz (JNM-GX400, a product of Japan Electron Optics Laboratory Co., Ltd.).

(2) Determination of Inherent Viscosity

Determined in a mixed phenol/tetrachloroethane solvent (60/40 weight ratio) at 30° C. using a Ubbelohde's viscometer.

(3) Determination of Liquid Crystal Phase Series

Determined by measurement using DSC (Du Pont 990 Thermal Analyzer) and observation using an optical microscope (BH2 Polarizing Microscope, a product of Olympus Optical Co., Ltd.).

(4) Determination of Twist Angle and $\Delta n \cdot d$

Twist angle was determined by a polarization analysis method and the value of $\Delta n \cdot d$ was determined by analyzing data obtained using an ellipsometer.

In each of the following Examples, the numerals written outside the square brackets in the formula representing polymer indicate molar compositions.

EXAMPLE 1

Using 60 mmol of terephthalic acid, 30 mmol of methylhydroquinone diacetate and 70 mg of sodium acetate, polymerization was conducted in a nitrogen atmosphere while raising temperature stepwise like 150° C., 1 hour, 200° C., 1 hour, and 250° C., 1 hour. Then, the polymerization was continued at 250° C. for 2 hours while passing nitrogen gas. Further, the polymerization was allowed to proceed for 1 hour at the same temperature and under reduced pressure. The resulting polymer was dissolved in tetrachloroethane and filtered. Subsequent reprecipitation with methanol afforded 10.0 g of purified polymer. This polymer proved to have an inherent viscosity of 0.13 and a glass transition point of 92° C.

There was prepared a 15 wt % tetrachloroethane solution containing the above polyester and an optically active polyester of the following formula at a weight ratio of 99:1.

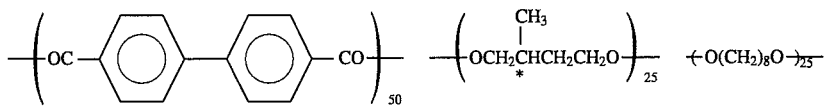

The polymer solution was applied by a screen printing method onto a glass base comprising a 1.1 mm thick glass plate of 10 cm×10 cm and a rubbing-treated polyimide layer formed thereon, then dried, heat-treated at 220° C. for 30 minutes and then cooled to obtain a compensator having a compensating layer thickness of 2.2 μm and with a twisted nematic structure solidified. The compensator was completely transparent, and as a result of observation using a polarizing microscope it turned out that a uniform monodomain structure was solidified. The twist angle of the compensator was −90° and $\Delta n \cdot d$ was 0.53 μm.

EXAMPLE 2

The compensator obtained in Example 1 was disposed on a twisted nematic (TN) liquid crystal cell using TFT having a twist angle of 90° and $\Delta n \cdot d$ of 0.53 μm in such a manner that the compensating layer was located on the upper side, as shown in FIG. 1. In this case, each optical axis was set so that the angle between the rubbing direction of upper base on the liquid crystal cell and the molecular orientation direction of the compensating layer surface in contact with the said upper base was 90° and the angle between two upper and lower polarizing films was 90°.

A compensating effect of this test cell was checked. As a result, in comparison with the omission of the compensator, there was little leakage of light in a dark state and there was obtained a far complete black color.

EXAMPLE 3

A 20 wt % solution of a mixed polymer (inherent viscosity of a base polymer: 0.15, Tg=83° C., inherent viscosity of an optically active polymer: 0.18) of the following formula (1) in phenol/tetrachloroethane was applied onto a glass base comprising a 1.1 mm thick glass plate of 10 cm×10 cm and a rubbing-treated polyimide layer formed thereon, by a screen printing method, then dried, heat-treated at 180° C. for 30 minutes and thereafter cooled to obtain a compensator having a compensating layer thickness of 4.0 μm and with a twisted nematic structure solidified. The compensator thus obtained was completely transparent, and as a result of observation using a polarizing microscope it turned out that a uniform monodomain structure was solidified. The compensator was found to have a twisting angle of −89° and Δn·d of 1.07 μm.

structure solidified. The compensator thus obtained was completely transparent. As a result of observation using a polarizing microscope it turned out that a uniform monodomain structure was solidified. The twist angle of this compensator was −91° and the value of Δn·d was 1.07 μm.

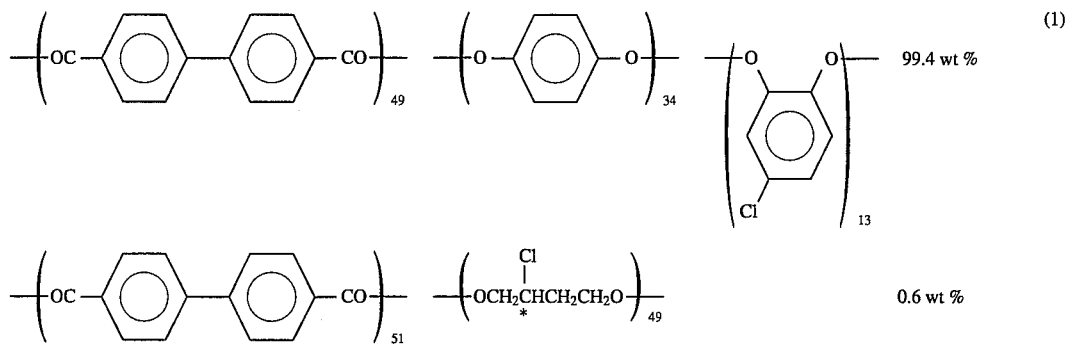

Next, the compensator was disposed on a twisted nematic (TN) liquid crystal cell using TFT having a twist angle of 90° and Δn·d of 1.07 μm in such a manner that the compensating layer was located on the upper side, as shown in FIG. 1. In this case, each optical axis was set so that the angle between the rubbing direction of an upper base on the liquid crystal cell and the molecular orientation direction of the compensator layer surface in contact with the said upper base was 90° and the angle between two upper and lower polarizing films was 90°.

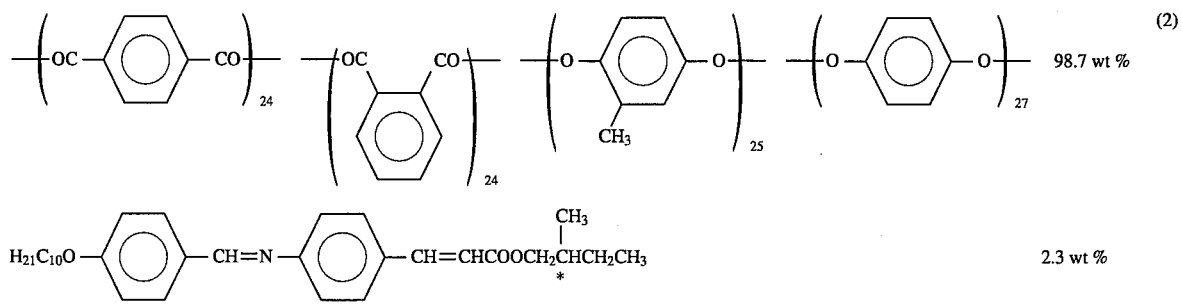

A compensating effect of this test cell was checked. As a result, in comparison with the omission of the compensator, there was little leakage of light in a dark state and there was obtained a far complete black color.

EXAMPLE 4

A 15 wt % solution of a mixed polymer (inherent viscosity of a base polymer: 0.18, Tg=72° C.) of the following formula (2) in tetrachloroethane. This solution was applied by a spin coating method onto an overcoated 120 μm thick polyether sulfone film of 10 cm×10 cm, using film having a rubbing-treated polyimide alignment layer as an orientating base, then dried, heat-treated at 150° C. for 40 minutes and thereafter cooled to obtain a compensator having a compensating layer thickness of 5.1 μm and with a twisted nematic Next, the compensator was disposed on a twisted nematic (TN) liquid crystal cell using the same TFT having a twist angle of 90° and Δn·d of 1.07 μm as that used in Example 3 in such a manner that the compensating layer was located on the upper side, as shown in FIG. 1. In this case, each optical axis was set so that the angle between the rubbing direction of an upper base on the liquid crystal cell and the molecular orientation direction of the compensating layer surface in contact with the said upper base was 90° and the angle between two upper and lower polarizing films was 90°.

A compensating effect of this test cell was checked. As a result, in comparison with the omission of the compensator, there was little leakage of light in a dark state and there was obtained a far complete black color.

EXAMPLE 5

A 20 wt % solution of an optically active polymer (inherent viscosity: 0.15, Tg=81° C.) of the following formula (3) in tetrachloroethane was prepared. This polymer solution was applied by a screen printing method onto a glass base comprising a 1.1 mm thick glass plate of 10 cm×10 cm and a rubbing-treated polyimide layer formed thereon, then dried, heat-treated at 180° C. for 60 minutes and thereafter cooled to obtain a compensator having a compensating layer thickness of 2.7 μm and with a twisted nematic structure solidified. The compensator thus obtained was completely transparent. As a result of observation using a polarizing microscope it turned out that a uniform monodomain structure was solidified. The twist angle of the compensator was −90° and the value of Δn·d was 0.50 μm.

pensating layer was located on the upper side, as shown in FIG. 1. In this case, each optical axis was set so that the angle between the rubbing direction of an upper base on the liquid crystal cell and the molecular orientation direction of the compensating layer surface in contact with the said upper base was 90° and the angle between two upper and lower polarizing films was 90°.

A compensating effect of this test cell was checked. As a result, in comparison with the omission of the compensator,

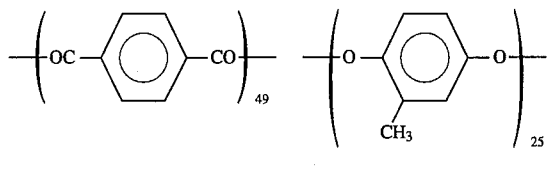

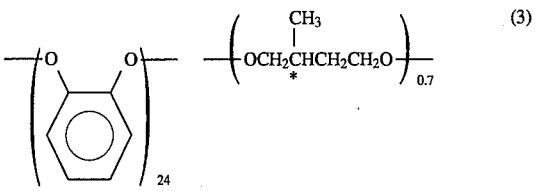
(3)

Next, the compensator was disposed on a twisted nematic (TN) liquid crystal cell using TFT having a twist angle of 90° and Δn·d of 0.48 μm in such a manner that the compensating layer was located on the upper side, as shown in FIG. 1. In this case, each optical axis was set so that the angle between the rubbing direction of an upper base on the liquid crystal cell and the molecular orientation direction of the compensating layer surface in contact with the said upper base was 90° and the angle between two upper and lower polarizing films was 90°.

A compensating effect of this test cell was checked. As a result, in comparison with the omission of the compensator, there was little leakage of light in a dark state and there was obtained a far complete black color.

EXAMPLE 6

A 18 wt % solution of an optically active polymer (inherent viscosity: 0.23) of the following formula (4) in trichloroethane was prepared. This polymer solution was applied by a screen printing method onto a triacetyl cellulose film having a rubbing-treated polyimide layer, with a size of 10 cm×10 cm and a thickness of 80 μm, then dried, heat-treated at 100° C. for 25 minutes and thereafter cooled to obtain a compensator having a compensating layer thickness of 8.1 μm and with a twisted nematic structure solidified. The compensator thus obtained was transparent. As a result of observation using a polarizing microscope it turned out that a uniform monodomain structure was solidified. The compensator was found to have a twist angle of −88° and Δn·d of 1.21 μm.

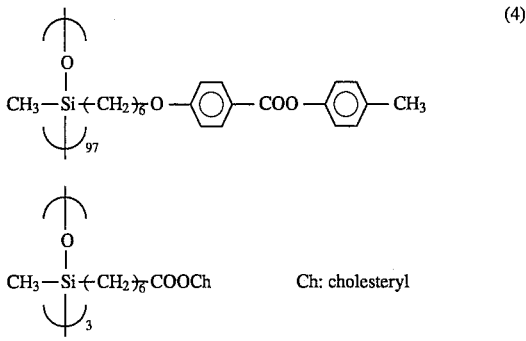
(4)

Next, the compensator was disposed on a twisted nematic (TN) liquid crystal cell using TFT having a twist angle of 90° and Δn·d of 1.21 μm in such a manner that the comthere was little leakage of light in a dark state and there was obtained an almost complete black color.

EXAMPLE 7

A 20 wt % solution of an optically active polymer (inherent viscosity: 0.09) of the following formula (5) in dimethylformamide was prepared. This polymer solution was applied by a spin coating method onto a glass plate having a rubbing-treated polyimide layer, with a size of 10 cm×10 cm and a thickness of 0.7 mm, then dried, heat-treated at 150° C. for 30 minutes and thereafter cooled to obtain a compensator having a compensating layer thickness of 6.5 μm and with a twisted nematic structure solidified. The compensator thus obtained was transparent. As a result of observation using a polarizing microscope it turned out that a uniform monodomain structure was solidified. The compensator was found to have a twist angle of −90° and Δn·d of 1.20 μm.

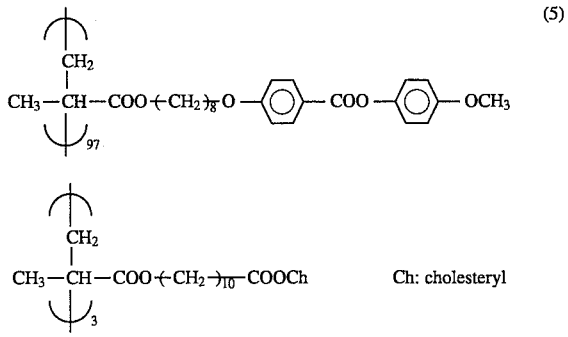
(5)

Next, the compensator was disposed on a twisted nematic (TN) liquid crystal cell using TFT having a twist angle of 90° and Δn·d of 1.21 μm in such a manner that the compensating layer was located on the upper side, as shown in FIG. 1. In this case, each optical axis was set so that the angle between the rubbing direction of an upper base on the liquid crystal cell and the molecular orientation direction of the compensating layer surface in contact with the said upper base was 90° and the angle between two upper and lower polarizing films was 90°.

A compensating effect of this test cell was checked. As a result, in comparison with the omission of the compensator, there was little leakage of light in a dark state and there was obtained an almost complete black color.

Since the compensator of the present invention is constituted by a liquid crystalline polymer with a twisted nematic orientation structure solidified, a single film thereof permits the simultaneous compensation of both phase difference and optical rotatory dispersion, and it is possible to completely cancel the interference color induced by a small cell gap of TFT-LCD. Consequently, the compensator of the invention is very effective in upgrading TFT-LCD and is of extremely great industrial value.

What is claimed is:

1. A compensator for liquid crystal display of an active matrix type constituted by a film of a liquid crystalline polymer which exhibits a twisted nematic orientation in a liquid crystal state and assumes a glassy state at temperatures below a liquid crystal transition point thereof, the constituent molecules of said liquid crystalline polymer film having a helical structure with a helical axis wherein the twist angle is in the range of 70 to 150 degrees, and the product $\Delta n \cdot d$ of birefringence $\Delta n$ of the liquid crystalline polymer film and the film thickness d being in the range of 0.2 to 3.0 μn, and wherein the constituent molecules of the liquid crystalline polymer fill are selected from the group consisting of polyesters, polyamides, polycarbonates, polyesterimides, polyacrylates, polymethacrylates, polymalonates, and polysiloxanes.

2. A compensator for liquid crystal display of an active matrix type comprising a light transmitting base, an alignment fill formed on said base, and a film of a liquid crystalline polymer formed on said alignment film, said liquid crystalline polymer exhibiting a twisted nematic orientation in a liquid crystal state and assuming a glassy state at temperatures below a liquid crystal transition point thereof, and wherein the constituent molecules of the liquid crystalline polymer fill are selected from the group consisting of polyesters, polyamides, polycarbonates, polyesterimides, polyacrylates, polymethacrylates, polymalonates, and polysiloxanes.

3. A compensator as set forth in claim 2, wherein the constituent molecules of said liquid crystalline polymer film have a helical structure with a helical axis in a direction perpendicular to said base, with a twist angle thereof being in the range of 70 to 150 degrees, and the product $\Delta n \cdot d$ of birefringence of $\Delta n$ of the liquid crystalline polymer film and the film thickness d is in the range of 0.2 to 3.0 μm.

4. A compensator according to claim 1, wherein the liquid crystalline polymer comprises a mixture of a nematic liquid crystalline polymer and an optically active low molecular weight liquid crystalline compound or an optically active liquid crystalline polyester.

5. A compensator according to claim 4, wherein the optically active compound constitutes between 0.1% and 30% by weight of said mixture.

6. A compensator according to claim 5, wherein the optically active compound constitutes between 0.3% and 20% by weight of said mixture.

7. A compensatory according to claim 1, wherein the twist angle is in the range of 80 to 120 degrees.

8. A compensator according to claim 1, wherein the product of said birefringence and said film thickness is between 0.3 and 2.5 μm.

9. A compensator according to claim 1, wherein the liquid crystalline polymer consists of a mixture of a nematic liquid crystalline polymer and an optically active compound.

10. A compensator according to claim 9, wherein the optically active compound constitutes between 0.1% and 30% by weight of said mixture.

11. A compensator according to claim 10, wherein the optically active compound constitutes between 0.3% and 20% by weight of said mixture.

12. A compensator according to claim 3, wherein the twist angle is in the range of 80 and 120 degrees.

13. A compensator according to claim 3, wherein the product of said birefringence and said film thickness is between 0.3 and 2.5 μm.

* * * * *

UNITED STATES PATENT AND TRADEMARK OFFICE
CERTIFICATE OF CORRECTION

PATENT NO. : 5,496,498
DATED : March 5, 1996
INVENTOR(S) : Takehiro Toyooka, et al.

It is certified that error appears in the above-indentified patent and that said Letters Patent is hereby corrected as shown below:

Column 1, line 35: after "polarizer" insert --.--
Column 18, line 63: " $(CH_2)_2 O$ " should read -- $(CH_2 \!\!+\!\! O$ --
Column 19, line 61: "m" should read --n--
Column 22, line 42: "caroon" should read --carbon--
Column 24, line 29: "3.0 82 m" should read --3.0 µm--
Column 31, line 19: "3.0 µn" should read --3.0 µm--
Column 31, line 20, Claim 1: "fill" should read --film--
Column 31, lines 26 & 32, Claim 2: "fill" should read --film--

Signed and Sealed this

Twenty-ninth Day of October 1996

Attest:

BRUCE LEHMAN

*Attesting Officer*     Commissioner of Patents and Trademarks